(12) United States Patent
Reshetenko et al.

(10) Patent No.: US 8,278,012 B2
(45) Date of Patent: Oct. 2, 2012

(54) MEMBRANE ELECTRODE ASSEMBLY FOR FUEL CELL, AND FUEL CELL SYSTEM INCLUDING THE SAME

(75) Inventors: Tatyana Reshetenko, Yongin-si (KR); Hee-Tak Kim, Yongin-si (KR); Ho-Jin Kweon, Yongin-si (KR)

(73) Assignee: Samsung SDI Co, Ltd., Yongin-si (KR)

( * ) Notice: Subject to any disclaimer, the term of this patent is extended or adjusted under 35 U.S.C. 154(b) by 1079 days.

(21) Appl. No.: 12/125,164

(22) Filed: May 22, 2008

(65) Prior Publication Data

US 2009/0075155 A1    Mar. 19, 2009

(30) Foreign Application Priority Data

Sep. 14, 2007    (KR) .................... 10-2007-0093636

(51) Int. Cl.
*H01M 4/00*    (2006.01)
(52) U.S. Cl. ........ 429/530; 429/137; 429/145; 429/209; 429/483; 429/523
(58) Field of Classification Search .................. 429/483, 429/423, 530
See application file for complete search history.

(56) References Cited

U.S. PATENT DOCUMENTS

| | | | |
|---|---|---|---|
| 2002/0068213 A1* | 6/2002 | Kaiser et al. .................... 429/40 |
| 2003/0134172 A1* | 7/2003 | Grande et al. .................. 429/34 |
| 2004/0058227 A1* | 3/2004 | Tanaka et al. .................... 429/44 |
| 2007/0048521 A1* | 3/2007 | Istvan ........................... 428/367 |
| 2007/0134545 A1 | 6/2007 | Deng et al. |
| 2008/0014495 A1* | 1/2008 | Saito et al. ....................... 429/44 |
| 2009/0239116 A1* | 9/2009 | Okumura et al. ............... 429/30 |

FOREIGN PATENT DOCUMENTS

| | | | |
|---|---|---|---|
| JP | 58-165259 | | 9/1983 |
| JP | 200780726 | * | 3/2007 |
| KR | 2007-14621 | | 2/2007 |
| KR | 10-738062 | | 7/2007 |
| WO | WO 2006/033253 | * | 3/2006 |
| WO | WO 2008013293 | * | 1/2008 |

OTHER PUBLICATIONS

Song et al., "Improvement in high temperature proton exchange membrane fuel cells cathode performance with ammonium carbonate", Journal of Power Sources 141 (2005) 250-257.*
JP 200780726-Translation.*

* cited by examiner

*Primary Examiner* — Patrick Ryan
*Assistant Examiner* — Ladan Mohaddes
(74) *Attorney, Agent, or Firm* — Christie, Parker & Hale, LLP

(57) ABSTRACT

A membrane-electrode assembly for a fuel cell, which includes an anode and a cathode facing each other; and a polymer electrolyte membrane disposed between the anode and cathode. The cathode includes a first catalyst layer that includes catalyst particles, and a second catalyst layer that includes the catalyst particles and a pore-forming agent. The membrane-electrode assembly efficiently performs mass transfer and release, due to pores in the second catalyst layer.

25 Claims, 9 Drawing Sheets

MEMBRANE ELECTRODE ASSEMBLY FOR FUEL CELL, AND FUEL CELL SYSTEM INCLUDING THE SAME

CROSS-REFERENCE TO RELATED APPLICATION

This application claims the benefit of Korean Application No. 2007-93636, filed Sep. 14, 2007, in the Korean Intellectual Property Office, the disclosure of which is incorporated herein by reference.

BACKGROUND OF THE INVENTION

1. Field of the Invention

Aspects of the present invention relate to a membrane-electrode assembly for a fuel cell, and a fuel cell system including the same. More particularly, aspects of the present invention relate to a membrane-electrode assembly that easily performs mass transfer and release, due to pores in a catalyst layer, and thereby improves fuel cell performance, and a fuel cell system including the same.

2. Description of the Related Art

A fuel cell is a power generation system for producing electrical energy, through an electrochemical redox reaction of an oxidant and hydrogen from a hydrocarbon-based material, such as, methanol, ethanol, or natural gas.

Such a fuel cell is a clean energy source that can reduce the need for fossil fuels. The fuel cell includes a stack of unit cells, and produces various ranges of power output. The fuel cell has four to ten times the energy density of a small lithium battery, and has accordingly been highlighted as a small portable power source.

Representative types of fuel cells include a polymer electrolyte membrane fuel cell (PEMFC) and a direct oxidation fuel cell (DOFC). The direct oxidation fuel cell can be a direct methanol fuel cell that uses methanol as a fuel.

In a fuel cell, a fuel is supplied to an anode, adsorbed on catalysts of the anode, and oxidized to produce protons and electrons. The electrons are transferred to a cathode, via an external circuit, and the protons are also transferred to the cathode, through the polymer electrolyte membrane. In addition, an oxidant is supplied to the cathode, and then the oxidant, protons, and electrons are reacted on catalysts of the cathode, to produce electricity and water.

In the above fuel cell, the stack that generates electricity includes a plurality of unit cells, which are stacked in multiple layers, and each unit cell is formed of a membrane-electrode assembly (MEA) and a separator (also referred to as a bipolar plate). The membrane-electrode assembly includes an anode (also referred to as a "fuel electrode" or an "oxidation electrode"), and a cathode (also referred to as an "air electrode" or a "reduction electrode"), which are separated by a polymer electrolyte membrane.

SUMMARY OF THE INVENTION

One exemplary embodiment of the present invention provides a membrane-electrode assembly that easily performs mass transfer and release, due to pores in a catalyst layer, and thereby improves fuel cell performance.

Another exemplary embodiment of the present invention provides a fuel cell system including the membrane-electrode assembly.

According to an exemplary embodiment of the present invention, provided is a membrane-electrode assembly that includes an anode and a cathode facing each other; and a polymer electrolyte membrane disposed between the anode and cathode. The cathode includes a first catalyst layer including first catalyst particles, and a second catalyst layer including second catalyst particles and a pore-forming agent.

According to aspects of the invention, the first catalyst layer contacts the polymer electrolyte membrane, and the second catalyst layer contacts the first catalyst layer.

According to an exemplary embodiment, the first catalyst layer has a thickness ranging from 15 to 25 μm. According to another exemplary embodiment, the first catalyst layer has a thickness ranging from 17 to 20 μm.

According to an exemplary embodiment, the second catalyst layer has a thickness ranging from 50 to 100 μm. According to another exemplary embodiment, the second catalyst layer has a thickness ranging from 65 to 90 μm.

According to aspects of the invention, the second catalyst layer has a specific BET surface area of 1.70 m2/g, or more. According to an exemplary embodiment, the second catalyst layer has a specific BET surface area of 1.80 to 9.00 m2/g.

According to aspects of the invention, the second catalyst layer includes first pores having an average diameter ranging from 20 to 50 nm, and second pores having an average diameter ranging from 1.4 to 3.0 μm.

According to aspects of the invention, the second catalyst layer has a first porosity ranging from 0.010 to 0.060 cm$^3$/g, due to the first pores, and a second porosity ranging from 0.23 to 0.29 cm$^3$/g, due to the second pores.

According to aspects of the invention, a pore-forming agent includes a carbon material that has a diameter ranging from 30 to 300 nm, and has a length ranging from 1 to 30 μm. The carbon material is selected from the group consisting of carbon nanotubes, carbon nanofibers, carbon nanowires, and a combination thereof.

According to aspects of the invention, when the pore-forming agent is the carbon nanofibers, the second catalyst layer has a specific BET surface area of 1.80 to 4.00 m$^2$/g. When the pore-forming agent is carbon nanotubes, the second catalyst layer has a specific BET surface area of 4.00 to 9.00 m$^2$/g.

According to aspects of the invention, the pore-forming agent is present in an amount of 1 to 20 weight %, based on the total weight of the second catalyst layer. When the pore-forming agent is the carbon nanofibers, the pore-forming agent is present in an amount of 1 to 5 weight %, based on the total weight of the second catalyst layer. When the pore-forming agent is the carbon nanotubes, the pore-forming agent is present in an amount of 1 to 10 weight %, based on the total weight of the second catalyst layer.

According to an exemplary embodiment of the present invention, the cathode of a membrane-electrode assembly includes a first catalyst layer including first catalyst particles, and a second catalyst layer including second catalyst particles and a pore-forming agent. The first catalyst layer contacts a polymer electrolyte membrane, and the included first catalyst particles maximize a catalyst reaction. The second catalyst layer contacts the first catalyst layer, and facilitates a secondary catalyst reaction, and the release of reaction products from the first catalyst layer, to improve the performance and the lifetime of a fuel cell.

According to another exemplary embodiment of the present invention, a fuel cell system is provided that includes: at least one electricity generating element; a fuel supplier that supplies the electricity generating element with a fuel; and an oxidant supplier that supplies the electricity generating element with an oxidant. The electricity generating element includes the above membrane-electrode assembly, and separators arranged on opposing sides thereof. The membrane-electrode assembly includes a cathode and an anode facing each other, and a polymer electrolyte membrane interposed therebetween.

According to aspects of the invention, the fuel cell system may be a direct oxidation fuel cell system.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1:
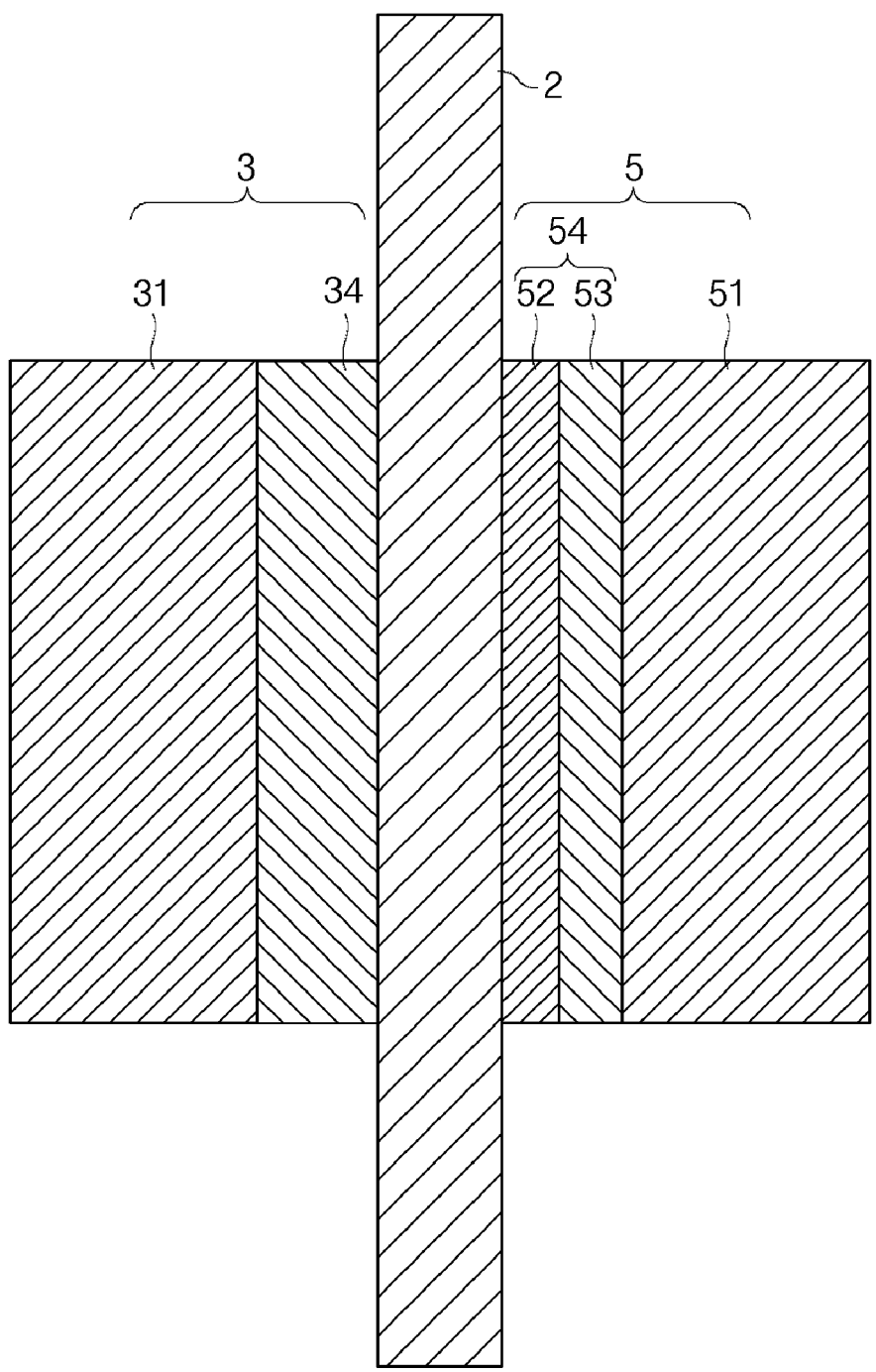
FIG. 1 is a schematic cross-sectional view showing a membrane-electrode assembly for a fuel cell, according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below, in order to explain the aspects of the present invention, by referring to the figures.

Generally, a cathode catalyst layer of a membrane-electrode assembly is provided by coating a composition, in which a metal catalyst and a binder are dispersed in a solvent, on an electrode substrate, or a polymer electrolyte membrane. Pores present in the catalyst layer supply a fuel or an oxidant, and release a reaction product, so that the activity of the metal catalyst is increased.

However, when the reaction product is difficult to release from the cathode catalyst layer, it is hard to supply reactants, such as, the fuel or the oxidant. This reduces the output characteristics of the fuel cell. Accordingly, in order to improve the performance of the fuel cell, it is important to optimize pores included in the catalyst layer, so that the resistance to mass transfer is minimized.

In order to form pores in a conventional catalyst layer, a pore-forming agent, such as, $(NH_4)_2CO_3$, $NH_4HCO_3$, or $(NH_4)_2C_2O_4$ is used. The pore-forming agent is mixed with a composition to form a catalyst layer, and then the pore-forming agent is removed, by a heat treatment process at 50 to 170° C., to generate pores in the resultant catalyst layer. In order to control the pore-size in the catalyst layer of the membrane-electrode assembly, the pore-forming agent is dispersed by equipment, such as a ball mill. However, it is difficult to control the average particle diameter of the pore-forming agent using a ball mill. Accordingly, when using such a pore-forming agent, it is difficult to control the size of micropores in the catalyst layer. Further, an additional heat treatment operation is required to remove the pore-forming agent. The heat treatment has a low efficiency for removing the pore-forming agent. Therefore, the pore-forming agent may remain in the catalyst layer, and reduce electron conductivity. In addition, when the temperature of the heat treatment is overly high, the activity of the catalyst is reduced.

FIG. 1 is a schematic cross-sectional view showing a membrane-electrode assembly 131 of a fuel cell, according to one exemplary embodiment of the present invention. The membrane-electrode assembly 131 generates electricity through fuel oxidation and oxidant reduction reactions. One or more of the membrane-electrode assemblies 131 are stacked together, to form a stack.

The membrane-electrode assembly 131 includes a cathode 5 and an anode 3 that face each other, and a polymer electrolyte membrane 2 interposed therebetween. The cathode 5 includes a cathode catalyst 54 and a cathode electrode 51. The cathode catalyst 54 includes a first catalyst layer 52 that includes first catalyst particles, and a second catalyst layer 53 that includes second catalyst particles and a pore-forming agent. The anode 3 includes an anode catalyst 34 and an anode electrode 31.

The first catalyst layer 52 contacts the polymer electrolyte membrane 2, and the first catalyst particles of the catalyst layer 52 promotes a primary catalyst reaction. The second catalyst layer 53 contacts the first catalyst layer 52, and promotes a secondary catalyst reaction, and facilitates the release of reaction products from the first catalyst layer 53, to improve the performance and the lifetime of a fuel cell. The cathode catalyst 54 facilitates the reduction of an oxidant. The anode catalyst 34 facilitates the oxidation of a fuel. The anode catalyst 34 and cathode catalyst 54 may comprise the same catalyst material. For example, the first and second catalyst particles can be the same material.

A thickness ratio, of the first catalyst layer 52 relative to the second catalyst layer 53, may range from 0.15 to 0.5. For example, the thickness ratio may range from 0.2 to 0.35. When the thickness ratio, of the first catalyst layer 52 relative to the second catalyst layer 53, is within either of the above ranges, fuel cell performance can be improved, due to a reduction of mass transfer limitations.

The first catalyst layer 52 can have a thickness ranging from 15 to 25 μm. For example, the first catalyst layer 52 can have a thickness ranging from 17 to 20 μm. The second catalyst layer 53 can have a thickness ranging from 50 to 100 μm. For example, the second catalyst layer 53 can have a thickness ranging from 65 to 90 μm. When the thickness ratio of the first catalyst layer 52 to the second catalyst layer 53 is within either of the above ranges, fuel cell performance can be improved.

The second catalyst layer 53 has a specific BET surface area of at least 1.70 m²/g. According to an exemplary embodiment, the second catalyst layer 53 has a specific BET surface area of from 1.80 to 9.00 m²/g. When the specific BET surface area of the second catalyst layer 53 is within either of the above ranges, the release of reaction products is facilitated.

The second catalyst layer 53 includes first pores having an average diameter ranging from 20 to 50 nm, and second pores having an average diameter ranging from 1.4 to 3.0 μm. The second catalyst layer 53 has a first porosity ranging from 0.010 to 0.060 $cm^3/g$, due to the first pores. The second catalyst layer 53 has a second porosity ranging from 0.23 to 0.29 $cm^3/g$, due to the second pores.

When the diameters of the first pores and the second pores, and the first and second porosities, are within the stated ranges, a vapor reaction product is released through the first pores, and a liquid reaction product is released through the second pores. Therefore, the reactants and the reaction products are easily transferred and released. However, when the average diameters of the first pores and the second pores are outside of the ranges, the vapor reaction product and the liquid reaction product can be transmitted and released together, without being separated. As a result, mass transfer efficiency may be reduced.

The pore-forming agent includes a carbon material that has a diameter ranging from 30 to 300 nm, and a length ranging from 1 to 30 μm. When the pore-forming agent has a specific shape, the pore size is easily controlled. Further, an additional process to remove the pore-forming agent is not required.

Examples of the pore-forming agent include a carbon material selected from the group consisting of carbon nanotubes, carbon nanofibers, carbon nanowires, and a combination thereof. When the carbon material is used as the pore-forming agent, the pore size is easily controlled. Further, an additional process to remove the pore-forming agent is not required.

When the pore-forming agent is carbon nanofibers, the second catalyst layer 53 has a specific BET surface area of 1.80 to 4.00 $m^2/g$. When the pore-forming agent is carbon nanotubes, the second catalyst layer 53 has a specific BET surface area of 4.00 to 9.00 $m^2/g$. The second catalyst layer 53 smoothly releases reaction products, when its specific BET surface area is within the above ranges.

The pore-forming agent is present in the second catalyst layer 53 at 1 to 20 weight %, based on the total weight of the second catalyst layer 53. When the pore-forming agent is carbon nanofibers, the pore-forming agent is present in the second catalyst layer 53 at 1 to 5 weight %, based on the total weight of the second catalyst layer 53. When the pore-forming agent is carbon nanotubes, the pore-forming agent is present in the second catalyst layer 53 at 1 to 10 weight %, based on the total weight of the second catalyst layer 53. When the pore-forming agent is included in these ranges, the diameters of the first pores and the second pores, and the first and second porosities of the second catalyst layer 52, are controlled, to thereby facilitate the mass transfer.

The anode and cathode electrodes 31 and 51 provide a path for transferring a fuel and an oxidant to the anode and cathode catalysts 34 and 54. In one exemplary embodiment, the anode and cathode electrodes 31 and 51 are formed from a material, such as, carbon paper, carbon cloth, carbon felt, or a metal cloth (a porous film including a metal fiber or a metal film disposed on a surface of a cloth including polymer fibers). The electrode materials are not limited thereto, however.

The polymer electrolyte membrane 2 acts as an ion exchanger, to transfer protons generated at the anode catalyst 34, to the cathode catalyst 54. The polymer electrolyte membrane 2 includes a polymer having excellent proton conductivity.

Figure 2:
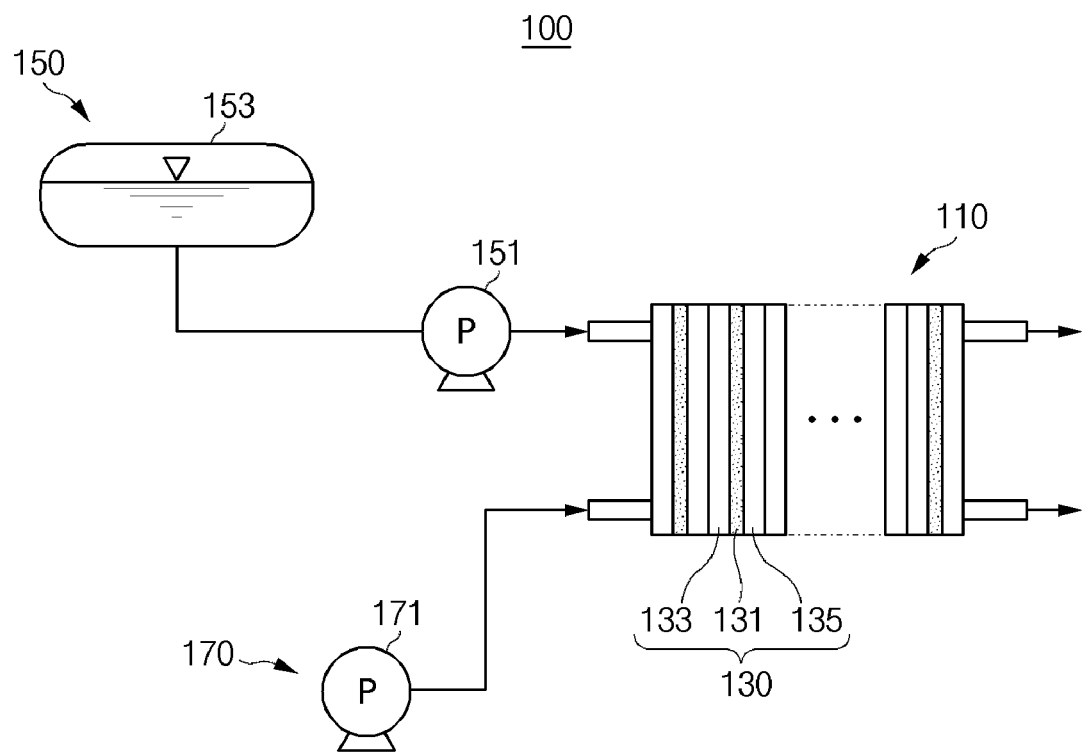
FIG. 2 schematically shows the structure of a fuel cell system, according to an exemplary embodiment of the present invention.

FIG. 2 shows a schematic structure of a fuel cell system 100, according to an exemplary embodiment. The fuel cell system 100 includes: at least one electricity generating element 130; a fuel supplier 150 that supplies the electricity generating element with a fuel; and an oxidant supplier 170 that supplies the electricity generating element 130 with an oxidant. The electricity generating element 130 includes the above membrane-electrode assembly 131, and separators 133 and 135 arranged on opposing sides thereof. The fuel cell system 100 may be a direct oxidation fuel cell system. The fuel can be hydrogen, or a hydrocarbon containing fuel, such as, methanol, ethanol, and natural gas.

The fuel supplier 150 is equipped with a tank 153 that stores the fuel, and a pump 151 that is connected therewith. The pump 151 pumps the fuel from the tank 153 to the stack 110. The oxidant supplier 170 supplies the electricity generating element 130 with the oxidant, and is equipped with at least one pump 171 to supply the oxidant to the stack 110. However, the present invention is not limited to such a structure. The fuel cell system 100 may alternatively include a structure wherein a fuel and an oxidant are provided by diffusion.

The electricity generating element 130 includes a membrane-electrode assembly 131 that oxidizes the fuel and reduces the oxidant, and separators 133 and 135 that are respectively positioned at opposite sides of the membrane-electrode assembly 131, and supply the fuel, and the oxidant, respectively.

The following examples illustrate the aspects of the present invention in more detail. However, it is understood that the present invention is not limited by these examples.

Fabrication of Fuel Cell

Example 1

An aqueous dispersion of Hispec® 1000 (a Pt black manufactured by Johnson Matthey) and 10 wt % Nafion® (manufactured by Dupont) was added to isopropyl alcohol, and agitated, to provide a composition to form a catalyst layer. The composition was coated on carbon paper by screen printing, and then dried, to provide a first catalyst layer of cathode, having a thickness of 18 μm. The first catalyst layer of the cathode included Pt, at 2 $mg/cm^2$.

An aqueous dispersion of Hispec® 1000, carbon nanotubes, and 10 wt % Nafion® was added into isopropyl alcohol, and agitated, to provide a composition to form catalyst layer. The composition was coated on the first catalyst layer by screen printing, and then dried, to provide a second catalyst layer of a cathode having a thickness of 82 μm. The second catalyst layer includes Pt at 6 $mg/cm^2$, and nanotubes at 1 weight %, based on the total weight of the second catalyst layer.

An aqueous dispersion of Hispec®6000, (a Pt/Ru black manufactured by Johnson Matthey) and 10 wt % Nafion® was added into isopropyl alcohol, and agitated, to provide a composition to form catalyst layer. The composition was coated on carbon paper by screen printing, and then dried, to provide an anode. The anode included Pt/Ru at 8 $mg/cm^2$.

A commercial Nafion® 115 membrane was treated in 3% hydrogen peroxide, at 90° C., for 2 hours, and in a 0.5M sulfuric acid aqueous solution, for 2 hours, and then washed in deionized water at 100° C., for one hour, to form a $H^+$-type Nafion® 115 polymer electrolyte membrane. The cathode and anode were positioned at opposing sides of the polymer electrolyte membrane, to fabricate a membrane-electrode assembly.

The membrane-electrode assembly was interposed between two gaskets, and then interposed between two separators equipped with a flow channel and a cooling channel of a predetermined shape, and then compressed between copper-end plates to fabricate a fuel cell.

Example 2

A fuel cell was fabricated, according to the same method as in Example 1, except that 5 weight % of carbon nanotubes was included, based on the total weight of the second catalyst layer of the cathode.

Example 3

A fuel cell was fabricated according to the same method as in Example 1, except that 10 weight % of carbon nanotubes was included, based on the total weight of the second catalyst layer of the cathode.

Example 4

A fuel cell was fabricated according to the same method as in Example 1, except that 15 weight % of carbon nanotubes was included, based on the total weight of the second catalyst layer of the cathode.

Example 5

A fuel cell was fabricated according to the same method as in Example 1, except that 20 weight % of carbon nanotubes was included, based on the total weight of the second catalyst layer of the cathode.

Example 6

A fuel cell was fabricated according to the same method as in Example 1, except that 1.5 weight % of carbon nanofibers (VGCF®, Showa Denko Co, Ltd.) was included, based on the total weight of the second catalyst layer of the cathode.

Example 7

A fuel cell was fabricated according to the same method as in Example 6, except that 3 weight % of carbon nanofibers was included, based on the total weight of the second catalyst layer of the cathode.

Example 8

A fuel cell was fabricated according to the same method as in Example 6, except that 5 weight % of carbon nanofibers was included, based on the total weight of the second catalyst layer of the cathode.

Example 9

A fuel cell was fabricated according to the same method as in Example 10, except that 10 weight % of carbon nanofibers was included, based on the total weight of the second catalyst layer of the cathode.

Example 10

A fuel cell was fabricated according to the same method as in Example 6, except that 15 weight % of carbon nanofibers was included, based on the total weight of the second catalyst layer of the cathode.

Example 11

A fuel cell was fabricated according to the same method as in Example 6, except that 20 weight % of carbon nanofibers was included based on the total weight of the second catalyst layer of the cathode.

Comparative Example 1

A fuel cell was fabricated according to the same method as in Example 1, except that the second catalyst layer of the cathode was not formed and the first catalyst layer having a thickness of 100 μm was formed.

Comparative Example 2

A fuel cell was fabricated according to the same method as in Example 1, except that the first catalyst layer of the cathode was not formed and the second catalyst layer having a thickness of 100 μm was formed.

Comparative Example 3

A fuel cell was fabricated according to the same method as in Example 2, except that the first catalyst layer of the cathode was not formed and the second catalyst layer having a thickness of 100 μm was formed.

Comparative Example 4

A fuel cell was fabricated, according to the same method as in Example 3, except that the first catalyst layer of the cathode was not formed and the second catalyst layer having a thickness of 100 μm was formed.

Comparative Example 5

A fuel cell was fabricated according to the same method as in Example 5, except that the first catalyst layer of the cathode was not formed and the second catalyst layer having a thickness of 100 μm was formed.

Comparative Example 6

A fuel cell was fabricated according to the same method as in Example 6, except that the first catalyst layer of the cathode was not formed and the second catalyst layer having a thickness of 100 μm was formed.

Comparative Example 7

A fuel cell was fabricated according to the same method as in Example 7, except that the first catalyst layer of the cathode was not formed and the second catalyst layer having a thickness of 100 μm was formed.

Comparative Example 8

A fuel cell was fabricated according to the same method as in Example 8, except that the first catalyst layer of the cathode was not formed and the second catalyst layer having a thickness of 100 μm was formed.

Comparative Example 9

A fuel cell was fabricated according to the same method as in Example 9, except that the first catalyst layer of the cathode was not formed and the second catalyst layer having a thickness of 100 μm was formed.

Observation of Pore-forming Agent with Transmission Electron Microscope (TEM)

Figure 3A:
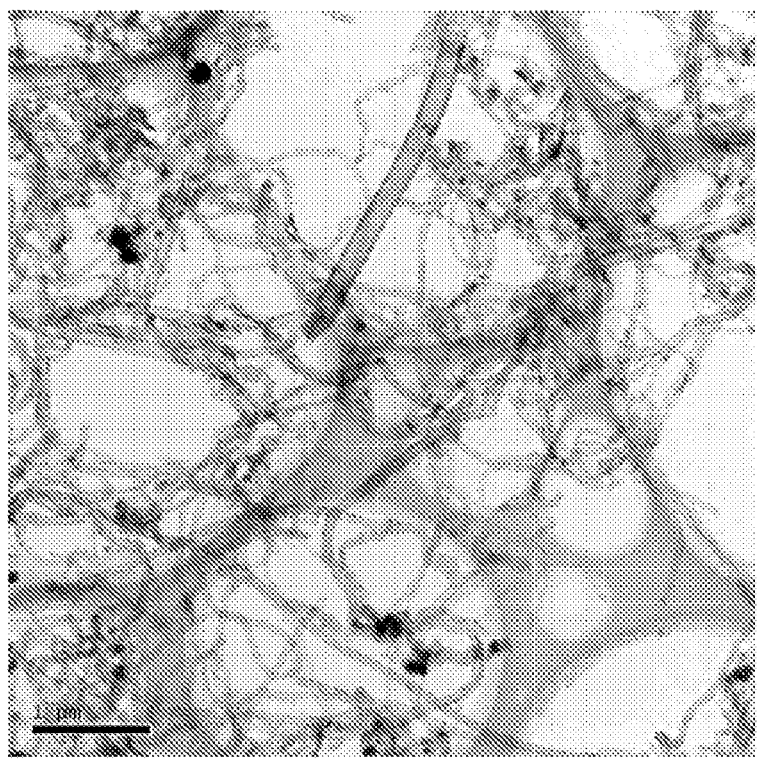
FIGS. 3A and 3B are transmission electron microscope (TEM) photographs of the carbon nanotubes used in an Example 1.
Figure 3B:
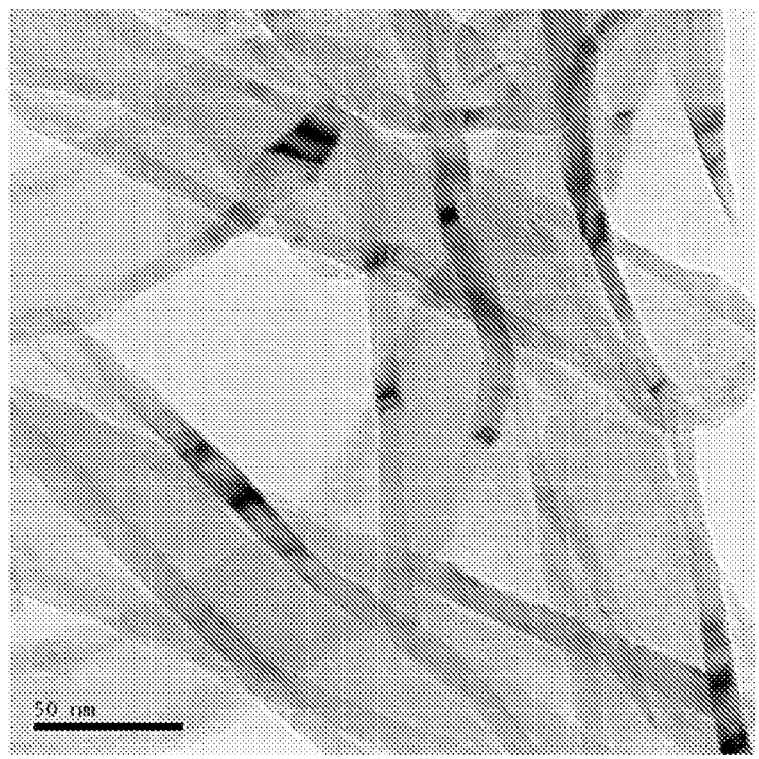
Figure 4A:
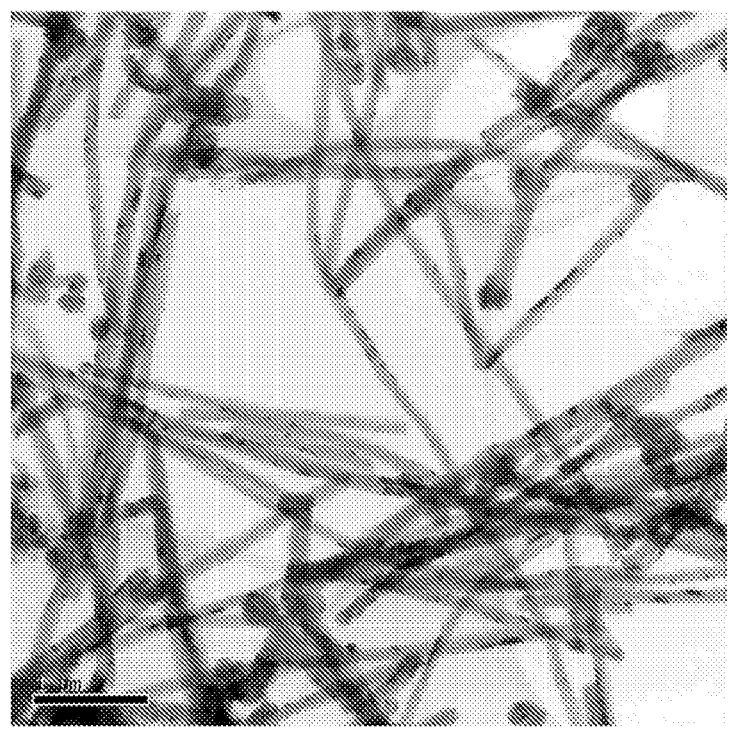
FIGS. 4A and 4B are transmission electron microscope (TEM) photographs of the carbon nanofibers used in an Example 6.
Figure 4B:
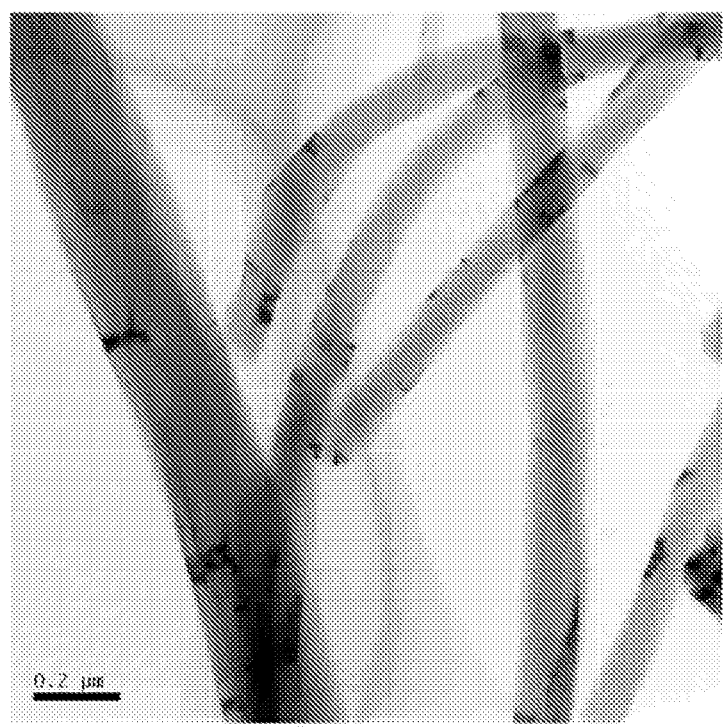

The carbon nanotubes in Example 1, and the carbon nanofibers in Example 6, were observed with a transmission electron microscope, and the results are shown in FIG. 3 and FIG. 4. Referring to FIG. 3 and FIG. 4, it was confirmed that each of the carbon nanotubes and carbon nanofibers used for the pore-forming agent had a diameter 30 to 300 nm and a length of 1 to 30 nm.

Observation Second Catalyst Layer with Scanning Electron Microscope (SEM)

Figure 5A:
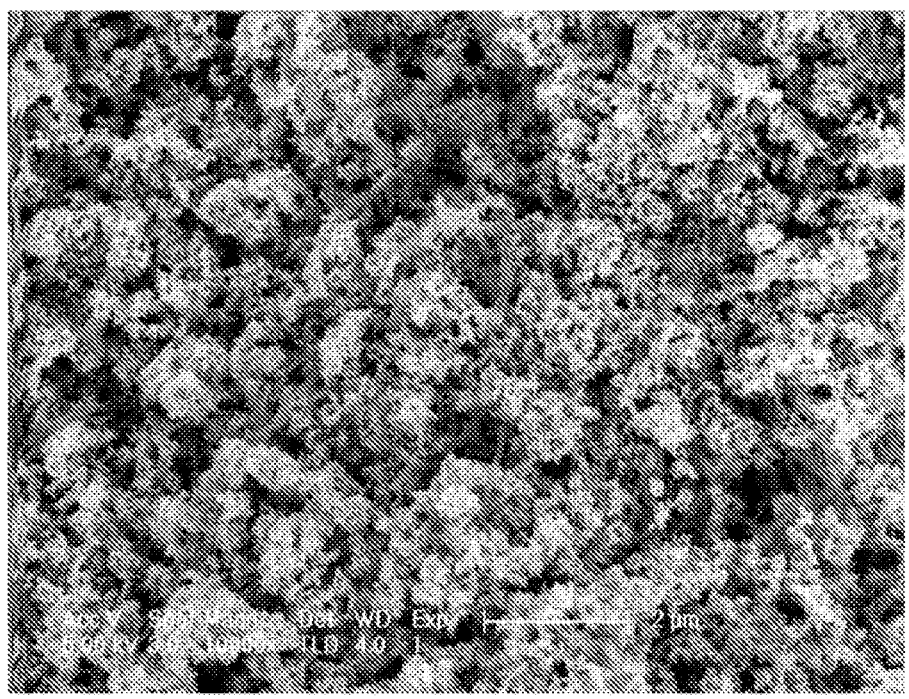
FIGS. 5A and 5B are scanning electron microscope (SEM) photographs of the second catalyst layer, according to an Example 2.
Figure 5B:
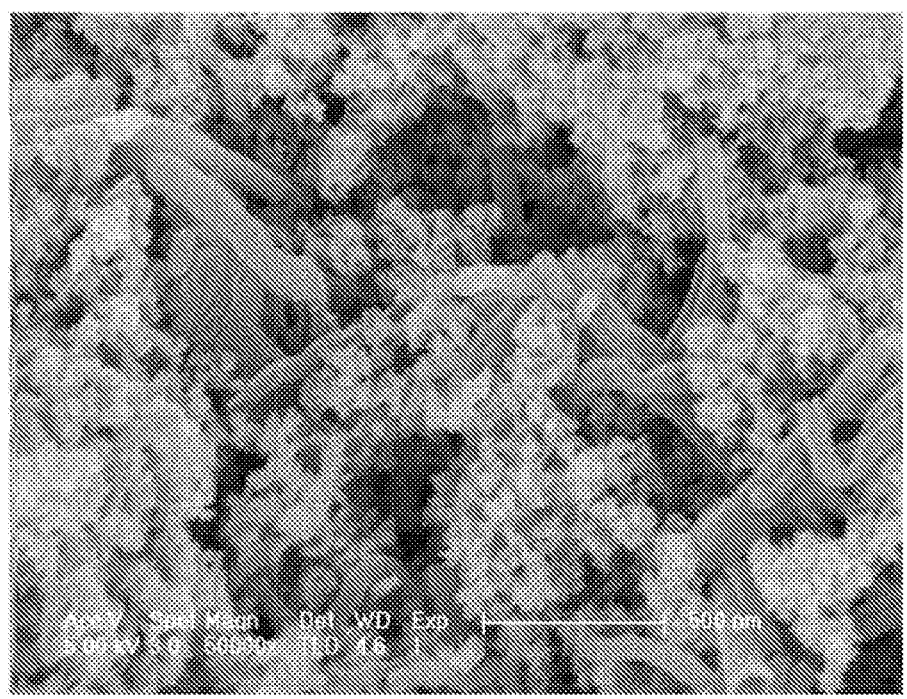
Figure 6A:
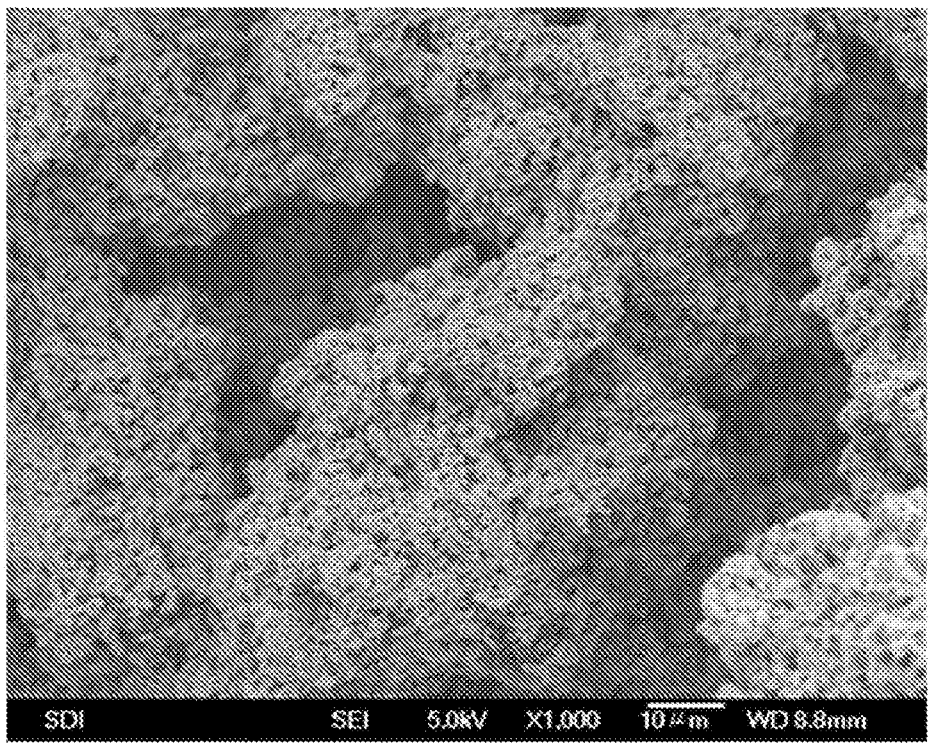
FIGS. 6A and 6B are scanning electron microscope (SEM) photographs of the second catalyst layer according to Example 6.
Figure 6B:
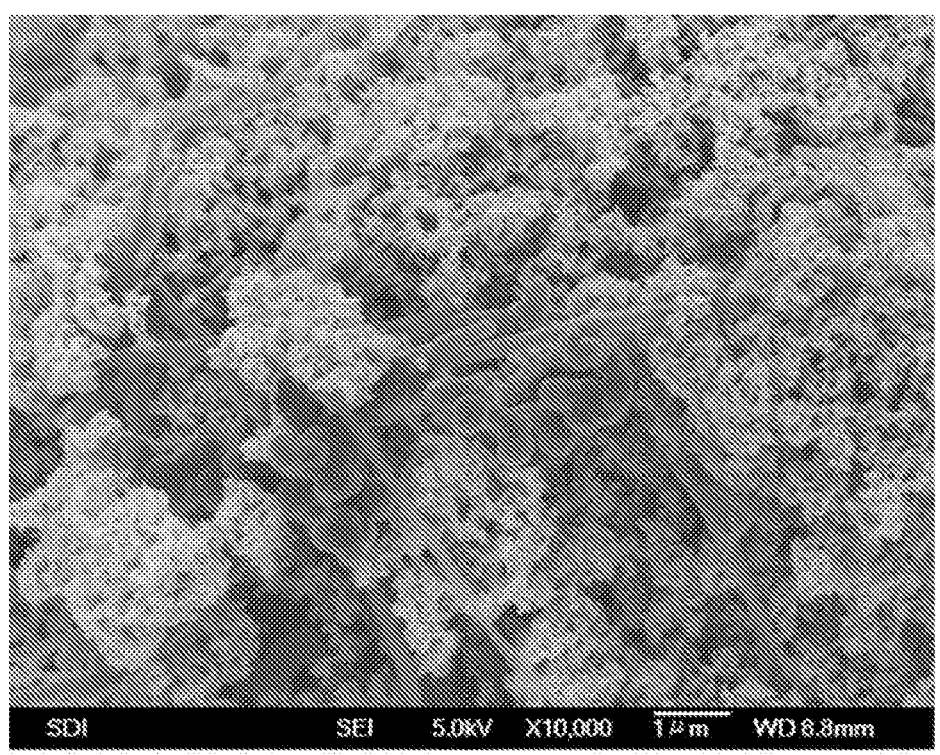
Figure 7:
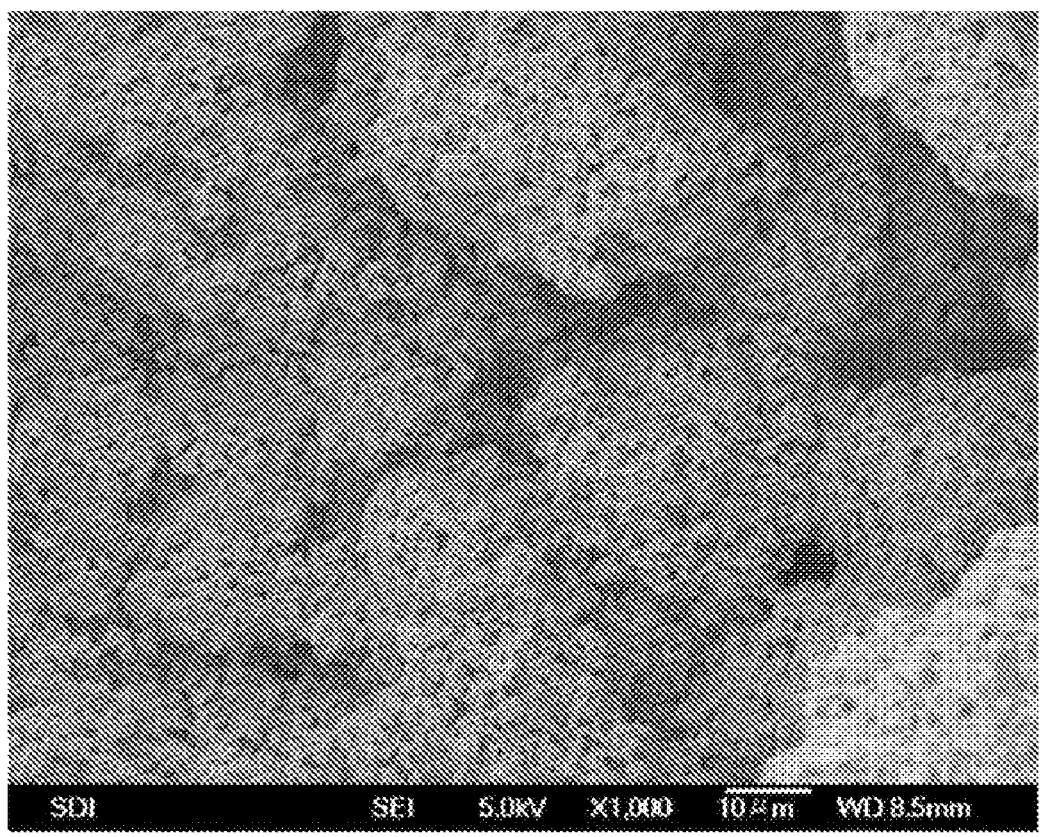
FIG. 7 is a scanning electron microscope (SEM) photograph of the second catalyst layer, according to a Comparative Example 1.

The second catalyst layers of cathodes according to Example 2, Example 6, and Comparative Example 1 were observed with a scanning electron microscope, and the results are shown in FIG. 5 to 7, respectively. Referring to FIG. 5 to 7, the second catalyst layers, according to Example 2 and Example 6, had an improved specific surface area as compared to Comparative Example 1.

Measurement of Specific Surface Area of Second Catalyst Layer

The second catalyst layers according to Examples 1 to 10 were measured to determine the specific BET surface area. The results for Examples 1 to 3, Examples 5 to 7, and Examples 9 and 10 are shown in the following Table 1. Further, the diameter and the porosity of the first pores and the second pores, according to Examples 1 to 10, were measured. The results of Examples 1 to 3, Examples 5 to 7, and Examples 9 and 10 are shown in the following Table 2.

For measuring by the BET method, $N_2$ adsorption was monitored by ASAP-2020® (manufacture by Micromeritics).

TABLE 1

|  | Specific surface area of the second catalyst layer ($m^2/g$) |
| --- | --- |
| Example 1 | 4.3 |
| Example 2 | 5.14 |
| Example 3 | 6.36 |
| Example 5 | 8.84 |
| Example 6 | 1.84 |
| Example 7 | 2.03 |
| Example 9 | 3.33 |
| Example 10 | 3.31 |
| Comparative Example 1 | 1.66 |

TABLE 2

|  | First pore of the second catalyst layer | | Second pore of the second catalyst layer | |
| --- | --- | --- | --- | --- |
|  | Porosity ($cm^3/g$) | Average diameter (nm) | Porosity ($cm^3/g$) | Average diameter (μm) |
| Example 1 | 0.039 | 42 | 0.232 | 1.5 |
| Example 2 | 0.039 | 33 | 0.256 | 2.0 |
| Example 3 | 0.049 | 35 | 0.282 | 2.3 |
| Example 5 | 0.059 | 29 | 0.282 | 2.7 |
| Example 6 | 0.012 | 37 | 0.241 | 1.5 |
| Example 7 | 0.017 | 27 | 0.251 | 1.7 |
| Example 9 | 0.022 | 38 | 0.272 | 1.7 |
| Example 10 | 0.014 | 27 | 0.281 | 2.0 |

Referring Table 1, it was confirmed that the second catalyst layers, according to Examples 1 to 3, Examples 5 to 7, and Examples 9 and 10, had higher specific surface areas than Comparative Example 1. Referring Table 2, the second catalyst layers, according to Examples 1 to 3, Examples 5 to 7, and Examples 9 and 10 included first pores having an average diameter of 20 to 50 nm, and a second pores having an average diameter of 1.4 to 3.0 μm. The first pores had a porosity of 0.010 to 0.060 $cm^3/g$ and the second pores had a porosity of 0.23 to 0.29 $cm^3/g$.

It was confirmed that Example 4 and Example 8 had similar specific surface areas, first pores, and second pores, as Examples 1 to 3, Examples 5 to 7, and Examples 9 and 10.

Measurement of Fuel Cell Performance

The fuel cells of Examples 1 to 11 and Comparative Examples 1 to 9 were applied to a methanol fuel cell system, and the performance of the fuel cells was measured at 50° C. and 70° C. The fuel cells of Examples 2 and 3, and Comparative Examples 1 to 9 were measured to determine power density, and a change of the power density over time is shown in the following Table 3, and FIGS. 8 and 9.

TABLE 3

|  | Temperature (° C.) | Power density (mW/cm²) | | | | | | | |
| --- | --- | --- | --- | --- | --- | --- | --- | --- | --- |
|  |  | 1st day | 2nd day | 3rd day | 4th day | 5th day | 6th day | 7th day | 8th day |
| Example 2 | 50 | 46 | 73 | 81 | 97 | 103 | 101 | 94 | 82 |
|  | 70 | 62 | 97 | 107 | 118 | 125 | 123 | 104 | 102 |
| Example 3 | 50 | 32 | 65 | 76 | 77 | 81 | 86 | 83 | — |
|  | 70 | 42 | 73 | 80 | 88 | 94 | 101 | 96 | — |
| Comparative Example 1 | 50 | 50 | 66 | 72 | 82 | 82 | 83 | 76 | — |
|  | 70 | 75 | 80 | 85 | 97 | 89 | 85 | 85 | — |
| Comparative Example 2 | 50 | 26 | 41 | 49 | 50 | 49 | — | — | — |
|  | 70 | 50 | 55 | 56 | 56 | 56 | — | — | — |
| Comparative Example 3 | 50 | 30 | 51 | 59 | 63 | 64 | 61 | 80 | 72 |
|  | 70 | 43 | 61 | 68 | 79 | 70 | 88 | 90 | 88 |
| Comparative Example 4 | 50 | 21 | 38 | 50 | 56 | 54 | 54 | — | — |
|  | 70 | 37 | 54 | 64 | 70 | 64 | 68 | — | — |
| Comparative Example 5 | 50 | 10 | 29 | 33 | 45 | 45 | — | — | — |
|  | 70 | 13 | 37 | 41 | 48 | 48 | — | — | — |
| Comparative Example 6 | 50 | 24 | 45 | 52 | 60 | 56 | 57 | 53 | — |
|  | 70 | 42 | 64 | 76 | 73 | 69 | 65 | 54 | — |
| Comparative Example 7 | 50 | 18 | 45 | 47 | 54 | 50 | 53 | 50 | 48 |
|  | 70 | 28 | 57 | 64 | 73 | 61 | 60 | 59 | 56 |
| Comparative Example 8 | 50 | 17 | 37 | 43 | 52 | 54 | 56 | 49 | — |

TABLE 3-continued

| | Temperature (° C.) | Power density (mW/cm²) | | | | | | | |
|---|---|---|---|---|---|---|---|---|---|
| | | 1st day | 2nd day | 3rd day | 4th day | 5th day | 6th day | 7th day | 8th day |
| | 70 | 29 | 55 | 64 | 71 | 77 | 77 | 61 | — |
| Comparative Example 9 | 50 | 20 | 38 | 51 | 51 | 39 | — | — | — |
| | 70 | 33 | 56 | 57 | 65 | 51 | — | — | — |

Figure 8:
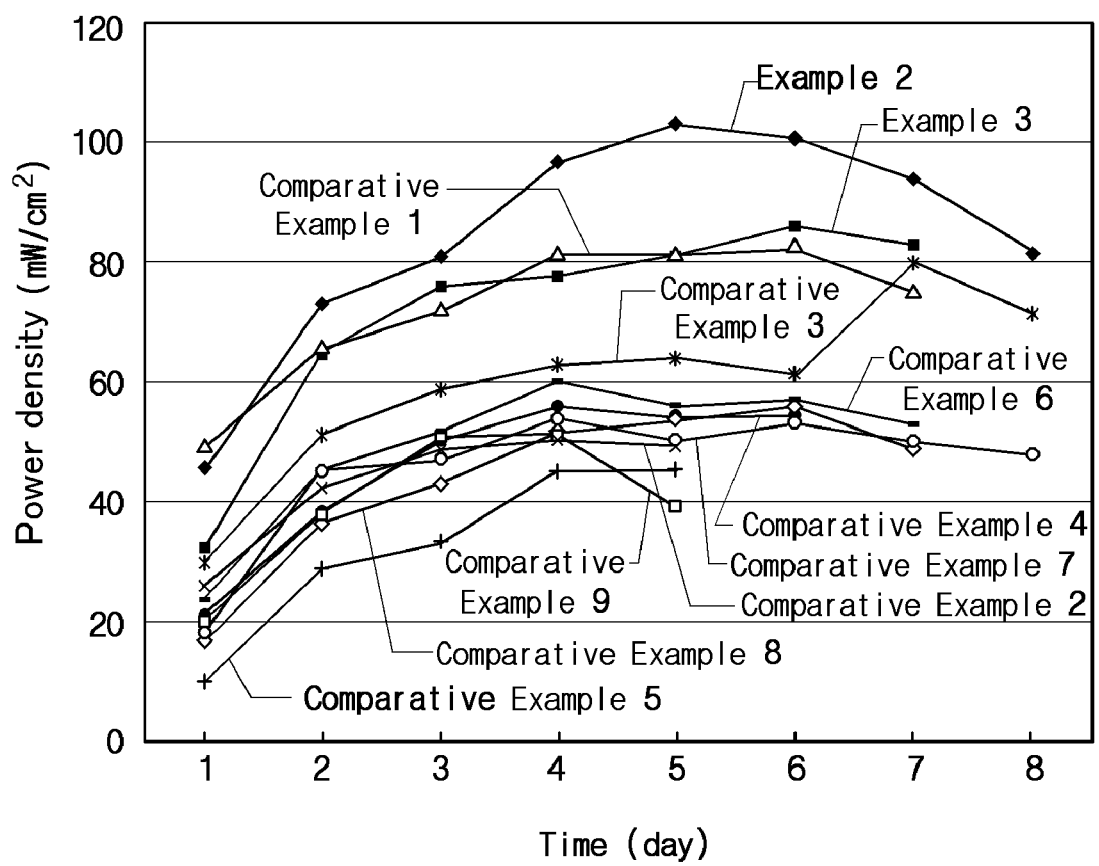
FIG. 8 is a graph showing a power density of fuel cells according to Examples 2 and 3, and Comparative Examples 1 to 9, at 50° C.
Figure 9:
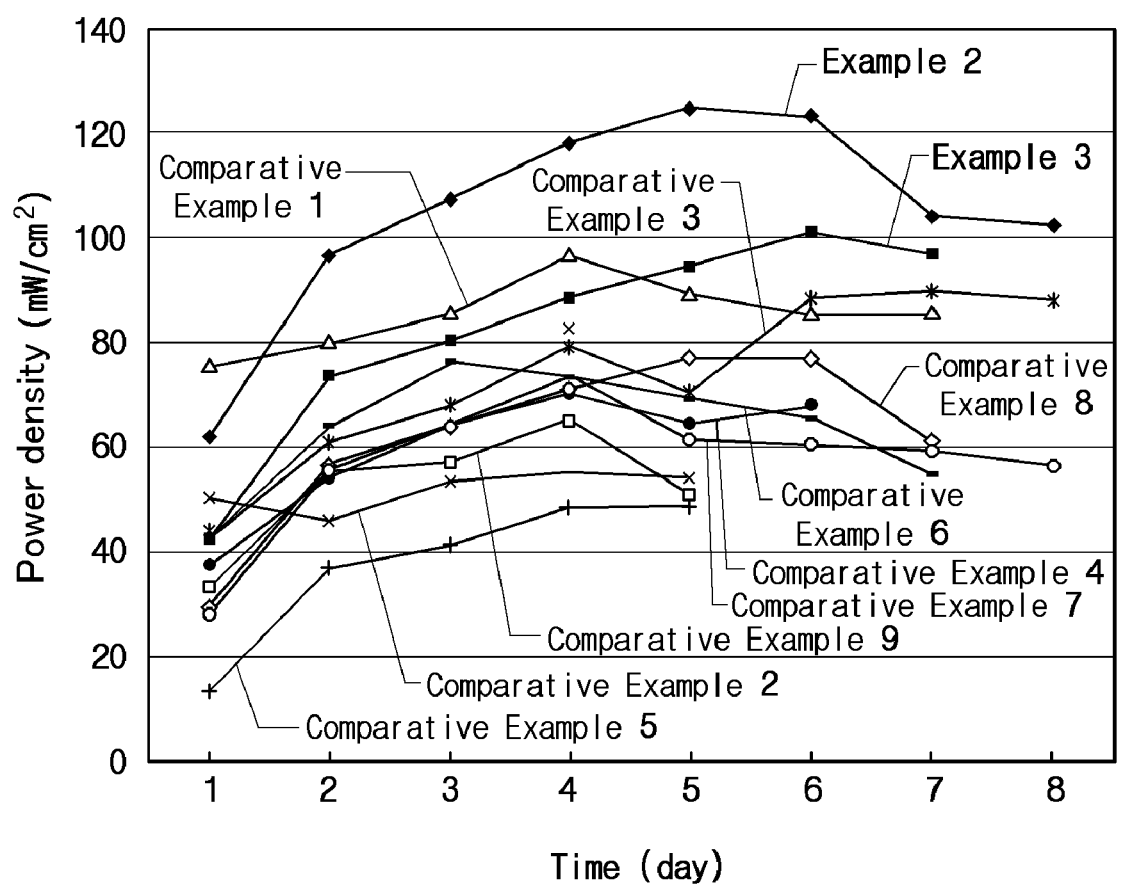
FIG. 9 is a graph showing a power density of fuel cells, according to Examples 2 and 3, and Comparative Examples 1 to 9, at 70° C.

Referring to Table 3, and FIGS. 8 and 9, it was confirmed that the fuel cells of Examples 2 and 3 had improved power density and lifespan, as compared to Comparative Examples 1 to 9.

Examples 1 and Examples 4 to 11 showed similar levels of power density as Examples 2 and 3.

The membrane-electrode assembly 131 has improved mass transfer and release, due to pores in a cathode catalyst 5, and thereby has improved power density and lifespan in a fuel cell.

Although a few embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A membrane-electrode assembly of a fuel cell, comprising;
   a cathode comprising,
      a first catalyst layer comprising first catalyst particles, and
      a second catalyst layer comprising second catalyst particles and a pore-forming agent that remains in the second catalyst layer, wherein the second catalyst layer comprises first pores having an average diameter ranging from 20 to 50 nm, and second pores having an average diameter ranging from 1.4 to 3.0 μm, and wherein the pore-forming agent comprises a carbon material that has a diameter ranging from 30 to 300 nm, and a length ranging from 1 to 30 μm;
   an anode;
   and a polymer electrolyte membrane between the anode and the cathode.

2. The membrane-electrode assembly of claim 1, wherein the first catalyst layer contacts the polymer electrolyte membrane, and the second catalyst layer contacts the first catalyst layer.

3. The membrane-electrode assembly of claim 1, wherein a thickness ratio of the first catalyst layer, relative to the second catalyst layer, ranges from 0.15 to 0.5.

4. The membrane-electrode assembly of claim 1, wherein the first catalyst layer has a thickness ranging from 15 to 25 μm.

5. The membrane-electrode assembly of claim 1, wherein the second catalyst layer has a thickness ranging from 50 to 100 μm.

6. The membrane-electrode assembly of claim 1, wherein the second catalyst layer has a specific BET surface area of 1.70 m²/g, or more.

7. The membrane-electrode assembly of claim 1, wherein the second catalyst layer has a porosity ranging from 0.010 to 0.060 cm³/g, due to the first pores.

8. The membrane-electrode assembly of claim 1, wherein the second catalyst layer has a porosity ranging from 0.23 to 0.29 cm³/g, due to the second pores.

9. The membrane-electrode assembly of claim 1, wherein the pore-forming agent is selected from the group consisting of carbon nanotubes, carbon nanofibers, carbon nanowires, and a combination thereof.

10. The membrane-electrode assembly of claim 1, wherein the pore-forming agent is present in an amount of 1 to 20 weight %, based on the total weight of the second catalyst layer.

11. A fuel cell system comprising:
   at least one membrane-electrode assembly comprising,
      a cathode comprising,
         a first catalyst layer comprising first catalyst particles, and
         a second catalyst layer comprising second catalyst particles and a pore-forming agent that remains in the second catalyst layer, wherein the second catalyst layer comprises first pores having an average diameter ranging from 20 to 50 nm, and second pores having an average diameter ranging from 1.4 to 3.0 μm, and wherein the pore-forming agent comprises a carbon material that has a diameter ranging from 30 to 300 nm, and a length ranging from 1 to 30 μm,
      an anode, and
      a polymer electrolyte membrane between the anode and the cathode;
   a fuel supplier that supplies the at least one membrane-electrode assembly with a fuel;
   and
      an oxidant supplier that supplies the at least one membrane-electrode assembly with an oxidant.

12. The fuel cell system of claim 11, wherein the fuel cell system is a direct oxidation fuel cell system.

13. The fuel cell system of claim 11, wherein the first catalyst layer contacts the polymer electrolyte membrane, and the second catalyst layer contacts the first catalyst layer.

14. The membrane-electrode assembly of claim 11, wherein a thickness ratio of the first catalyst layer, relative to the second catalyst layer, ranges from 0.15 to 0.5.

15. The fuel cell system of claim 11, wherein the first catalyst layer has a thickness ranging from 15 to 25 μm.

16. The fuel cell system of claim 11, wherein the second catalyst layer has a thickness ranging from 50 to 100 μm.

17. The fuel cell system of claim 11, wherein the second catalyst layer has a specific BET surface area of 1.70 m²/g or more.

18. The fuel cell system of claim 11, wherein the second catalyst layer has a porosity ranging from 0.010 to 0.060 cm³/g, due to the first pores.

19. The fuel cell system of claim 11, wherein the second catalyst layer has a porosity ranging from 0.23 to 0.29 cm³/g, due to the second pores.

20. The fuel cell system of claim 11, wherein the pore-forming agent is selected from the group consisting of carbon nanotubes, carbon nanofibers, carbon nanowires, and a combination thereof.

21. The fuel cell system of claim 11, wherein the pore-forming agent is present in an amount of 1 to 20 weight %, based on the total weight of the second catalyst layer.

22. The membrane-electrode assembly of claim 1, wherein the first catalyst particles and the second catalyst particles comprise the same material.

23. The fuel cell system of claim 11, wherein the first catalyst particles and the second catalyst particles comprise the same material.

24. A membrane-electrode assembly of a fuel cell, comprising;
   a polymer electrolyte membrane;
   a cathode disposed on a first side of the polymer electrolyte membrane, comprising,
      a first catalyst layer in contact with the first side of the membrane, comprising first catalyst particles, and
      a second catalyst layer in contact with the first catalyst layer, comprising second catalyst particles, a carbon pore-forming material, first pores having an average diameter ranging from 20 to 50 nm, and second pores having an average diameter ranging from 1.4 to 3.0 µm, wherein the carbon pore-forming material comprises a carbon material that has a diameter ranging from 30 to 300 nm, and a length ranging from 1 to 30 µm; and
   an anode on a second side of the polymer electrolyte membrane.

25. The membrane electrode assembly of claim 24, wherein the second catalyst layer has a first porosity ranging from 0.010 to 0.060 cm$^3$/g, due to the first pores, and a second porosity ranging from 0.23 to 0.29 cm$^3$/g, due to the second pores.

* * * * *